United States Patent
Hellandbrand, Jr. et al.

(10) Patent No.: US 7,453,972 B2
(45) Date of Patent: Nov. 18, 2008

(54) NUCLEAR FUEL ASSEMBLY CONTROL ROD DRIVE THIMBLE TO BOTTOM NOZZLE CONNECTOR

(75) Inventors: Patrick A. Hellandbrand, Jr., East Hartford, CT (US); Stephen C. Kereakoglow, Columbia, SC (US); Michael O. Bausch, Lexington, SC (US); Richard P. Broders, Grandbury, CT (US)

(73) Assignee: Westinghouse Electric Co. LLC, Pittsburgh, PA (US)

( * ) Notice: Subject to any disclaimer, the term of this patent is extended or adjusted under 35 U.S.C. 154(b) by 45 days.

(21) Appl. No.: 11/450,077

(22) Filed: Jun. 9, 2006

(65) Prior Publication Data

US 2007/0286326 A1    Dec. 13, 2007

(51) Int. Cl.
*G21C 3/32* (2006.01)

(52) U.S. Cl. .................... 376/446; 376/440; 376/449; 376/364; 411/190; 411/201; 411/204

(58) Field of Classification Search ............... 376/446, 376/364, 440, 449; 176/76, 78, 50, 61, 87, 176/66, 67, 73, 75, 79; 411/190, 337, 378, 411/924.1
See application file for complete search history.

(56) References Cited

U.S. PATENT DOCUMENTS

| | | | | |
|---|---|---|---|---|
| 1,206,410 | A * | 11/1916 | Butler | 411/326 |
| 3,389,056 | A * | 6/1968 | Erling | 376/445 |
| 3,791,466 | A | 2/1974 | Patterson et al. | |
| 3,814,667 | A * | 6/1974 | Klimb et al. | 376/364 |
| 3,853,703 | A * | 12/1974 | Anthony et al. | 376/364 |
| 3,992,259 | A * | 11/1976 | Anthony et al. | 376/440 |
| 4,309,251 | A * | 1/1982 | Anthony et al. | 376/446 |
| 5,141,701 | A * | 8/1992 | Bryan | 376/364 |
| 5,852,644 | A | 12/1998 | Brosset et al. | |

* cited by examiner

*Primary Examiner*—Jack W Keith
*Assistant Examiner*—Vadim Dudnikov

(57) ABSTRACT

A secure connection between the bottom nozzle of a nuclear fuel assembly and the control rod guide thimbles having two or four crimped pockets in the side wall of a bottom nozzle leg counterbore which are formed by drilling two or four blind holes through the top surface of the bottom nozzle. After attaching the bottom nozzle to the fuel assembly with a crimp bolt a pneumatic tool is then inserted into a flanged cup feature on the crimp bolt head and the flanged portion of the cup feature of the crimp bolt is deformed into the crimp pockets. The crimp pockets are contained within the leg counterbore and prevent the screw from rotating or falling out of the assembly in the event of preload loss or screw fracture.

10 Claims, 3 Drawing Sheets ized and receive support and alignment from upper and lower traversely extending core support plates. These upper and lower core support plates are directly or indirectly attached to a support barrel which surrounds the entire core and extends between the ends thereof. In the most common configuration, the axis of the core support barrel extends vertically and the various fuel assemblies are also arranged vertically resting on the lower support plate. Generally, in most reactors, a fluid coolant such as water, is directed upwardly through apertures in the lower core support plate and along the various fuel assemblies to receive the thermal energy therefrom. Conventional designs of these fuel assemblies include a plurality of fuel rods and control rod guide thimbles held in an organized array by grids spaced along the fuel assembly length and attached to the control rod guide thimbles. Top and bottom nozzles on opposite ends thereof are secured to the control rod guide thimbles; thereby forming an integral fuel assembly. The respective top and bottom nozzles extend slightly above and below the ends of the fuel rods, capturing the rods therebetween.

NUCLEAR FUEL ASSEMBLY CONTROL ROD DRIVE THIMBLE TO BOTTOM NOZZLE CONNECTOR

BACKGROUND OF THE INVENTION

1. Field of the Invention

The present invention relates generally to fuel assemblies for nuclear reactors and, more particularly, is directed to an improved connection between the lower nozzle of the fuel assemblies and the control rod guide thimbles.

2. Background Information

In most nuclear reactors the core portion is comprised of a large number of elongated fuel elements or rods grouped in and supported by structural frame works referred to as fuel assemblies. The fuel assemblies are generally elongated and receive support and alignment from upper and lower traversely extending core support plates. These upper and lower core support plates are directly or indirectly attached to a support barrel which surrounds the entire core and extends between the ends thereof. In the most common configuration, the axis of the core support barrel extends vertically and the various fuel assemblies are also arranged vertically resting on the lower support plate. Generally, in most reactors, a fluid coolant such as water, is directed upwardly through apertures in the lower core support plate and along the various fuel assemblies to receive the thermal energy therefrom. Conventional designs of these fuel assemblies include a plurality of fuel rods and control rod guide thimbles held in an organized array by grids spaced along the fuel assembly length and attached to the control rod guide thimbles. Top and bottom nozzles on opposite ends thereof are secured to the control rod guide thimbles; thereby forming an integral fuel assembly. The respective top and bottom nozzles extend slightly above and below the ends of the fuel rods, capturing the rods therebetween.

Generally, in each fuel assembly, there are a number of grids axially spaced along the fuel assembly length and traversely extending across the assembly. Convention designs of these grids include a plurality of interleaved straps of egg-crate configuration designed to form a plurality of cell openings, with each cell opening adapted to receive therethrough one of the fuel rods. A peripheral strap, being of the same height of the interleaved straps, encloses the interleaved straps to impart strength and rigidity to the grid. The purpose of these grids is twofold. One purpose is for the lateral support or positioning of the fuel rods so as to prevent localize neutron flux peaking and thereby permit operation of the reactor closer to its design power limit. The other purpose is for the mounting of deflecting vanes to promote mixing of the upwardly flowing coolant along the fuel rods to average the enthalpy/temperature rise for maximizing the power output of the reactor core. Normally, for lateral support or positioning of the fuel rods, each cell opening includes an arrangement of spring fingers and dimple protrusions which provide a six point contact of the fuel rods. For deflecting the coolant flow, some or each of the cell openings of the grids are provided with cantilevered deflecting vanes for deflecting the coolant. All of these prior art grids extend completely across the fuel assembly and separately surround each of the fuel rods contained in the assembly. Furthermore, the construction of each of these grids is such that its outer peripheral strap is of a height equal to a height of its inner straps.

The power output of a nuclear reactor is limited by the rate at which heat can be removed from the reactor core, and the rate of heat transferred determines the temperatures developed in a reactor core. Therefore, the maximum reactor operating power is limited by some enthalpy and/or temperature value in the reactor core. The variation of the neutron flux in the reactor core causes the fuel assemblies in the core to operate at different power levels, and this variation occurs even among the fuel rods within a single fuel assembly. The reactivity and, in-turn, the power output of a nuclear reactor is limited by the amount of structural material in the reactor core, as the structural material parasitically absorbs neutrons which could otherwise be used in the fission process. Furthermore, a reduction of the structural material in the fuel assembly reduces the pressure drop and thereby increases the power output. Still further, it is well known, that the burn up rate for the different fuel rods contained in a given fuel assembly varies. And still further, the output of the given fuel assembly can be enhanced by the use of different fissionable materials, as well as, by the amount of fissionable material, such as through the use of different diameter sized fuel rods. With these considerations in mind, designers are constantly striving to improve upon the power output of the various fuel assemblies which make up a core to increase the total power output of the reactor, while at the same time, striving to improve on the construction of the assemblies so as to facilitate the assembly of the fuel assembly and to reduce the repair and maintenance cost associated with operating the reactor. Some of these costs are associated with the fixed components of the fuel assembly forming the fuel assembly skeleton. The skeleton comprises essentially the upper and lower nozzles with the guide thimbles and instrumentation tube rigidly connected therebetween and the spaced, tandem arrangement of grids fixedly connected to the guide thimbles between the upper and lower nozzles. Currently, in one design of a fuel assembly, the control rod guide thimbles are secured to the lower nozzle through a screw that extends through the lower nozzle into the guide thimble. The guide thimble screw is retained in position by a circular locking disc that mates with a slot in the thimble screw head and is welded to the inside of the bottom nozzle leg counterbore through which the screw extends. The welding procedure requires the ability of a skilled operator and inspection of the finished product is very difficult because of the deep recess in the bottom nozzle leg counterbore. This weld procedure is performed after the fuel assembly is loaded with fuel rods, thus raising the level of difficulty in completing the task as well as increasing the difficulty of recovery should an improper weld be performed.

Accordingly, an improved attachment mechanism is desired to secure the control rod guide thimble to the bottom nozzle that does not require welding.

Furthermore, a new attachment mechanism is desired that will fasten the control rod guide thimbles to the bottom nozzle that can easily be re-worked if a defective connection is identified.

Additionally, a new connection between the bottom nozzle and control rod guide thimbles is desired that requires fewer components and can be more easily inspected.

SUMMARY OF THE INVENTION

Thus, in view of the above mentioned design considerations, the present invention provides a nuclear reactor fuel assembly with an improved control rod guide thimble to lower nozzle connection that has fewer components and is easier to implement, re-work and inspect.

The connection is formed by an elongated fastener bolt having a head and a shank. The shank of the fastener bolt extends from the head concentric with the axis of the elongated dimension of the fastener bolt and has a profile designed to engage a female latch profile on the inside of the mating end of the control rod guide thimble. The upper surface of the fastener bolt head is fitted with a torque contour recess such as a drive hex that can be engaged by a torque tool to place the shank in engagement with the female latch profile on the interior of the control rod guide thimble. The upper surface of the fastener bolt head also has a raised, deformable rim. To secure the connection between the bottom nozzle and the control rod guide thimble the shank is inserted through a hole in the bottom nozzle to engage the female latch profile in the control rod guide thimble and fasten the control rod guide thimble to the bottom nozzle. At least a portion of the deformable rim on the head of the fastener bolt is crimped outwardly of the central axis of the fastener bolt to engage a recess in the bottom nozzle that locks the fastener bolt from disengaging from the female latch profile of the control rod guide thimble.

In one preferred embodiment the female latch profile is a female thread on the interior of the bottom end of the control rod guide thimble that mates with a male thread on the shank of the fastener bolt. In another preferred embodiment the bottom nozzle has an underside portion that has a series of counterbores of varying diameters that are in line with the control rod guide thimble fastened to the bottom nozzle. The underside portion aligned with the control rod guide thimble, has a first counterbore having the first diameter at least as large as the diameter of the head of the fastener bolt. The first counterbore extends up into the bottom nozzle, parallel to the axis of the fuel assembly a first distance with the central line of the counterbore aligned with the axis of the control rod guide thimble. A second counterbore extends coaxially with the first counterbore from the first distance to a second distance wherein the second counterbore has a diameter at least as large as the diameter of the head of the fastener bolt. A third counterbore extends coaxially with the second counterbore from the second distance to a third distance. The third counterbore has a nominal diameter at least as large as the diameter of the fastener bolt head with portions of the circumference of the third counterbore having a larger diameter than the second counterbore, wherein the intersection of the portions of the second counterbore and the portions of the circumference of the third counterbore having the diameter larger than the second bore forms a ledge and the first distance, second distance, and the third distance are collectively less than the height of the lower nozzle. A fourth bore extends coaxially with the third counterbore from the third distance through an upper surface of the bottom nozzle, in line with the control rod guide thimble fastened to the bottom nozzle. The diameter of the fourth bore is smaller than the diameter of the head of the fastener bolt and the crimped portion of the deformable rim and the head of the fastener bolt are captured between the ledge and the fourth bore.

In another preferred embodiment, the portions of the circumference of the third counterbore having a diameter larger than the second counterbore are formed by spaced drilled holes around the outer circumference of the fourth bore, that extend into the surface of a wall of the third counterbore and form the recesses in the bottom nozzle that locks the fastener bolt from disengaging from the female latch profile of the control rod guide thimble. Preferably, the holes comprise a pair of diametrically spaced holes positioned around the outer periphery of the fourth bore that extend into the surface wall of the third counterbore. The holes are preferably spaced ninety degrees apart from each other around the periphery of the fourth bore. Most desirably the counterbore is formed in a leg of the bottom nozzle and the fastener bolt is provided with a drain hole extending through the head and shank along its major axis.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENTS

Figure 1:
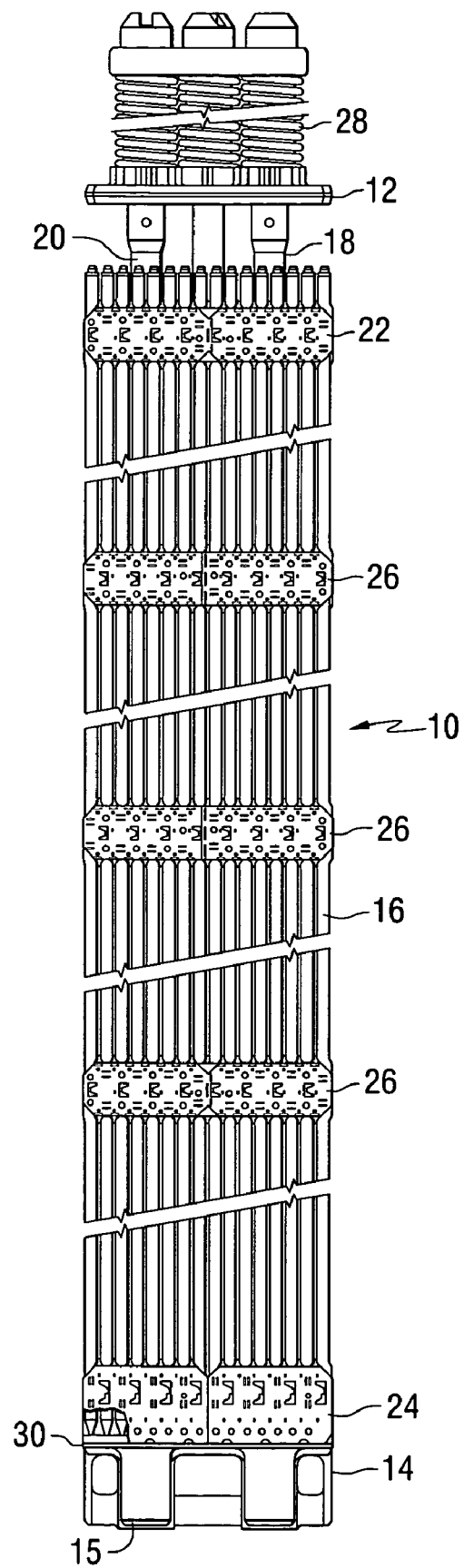
FIG. 1 is a perspective view of a conventional fuel assembly incorporating the improved connection between the bottom nozzle and the control rod guide thimble of this invention.

Referring to the drawings, particularly to FIG. 1, the fuel assembly 10 is shown comprising an upper end structure or nozzle 12, a lower end structure or nozzle 14, a generally square array of substantially parallel elongated fuel elements or rods 16, a plurality of elongated hollow tubular members 18 containing control elements 20 strategically located among the array of fuel element 16, a top grid member 22, a bottom grid member 24, and a plurality of intermediate grid members 26 longitudinally spaced along the tubular members 18, which are also referred to as control rod guide thimbles or guide tubes. An instrumentation tube is located at the center of the fuel assembly, although not shown.

As shown in FIG. 1 the upper end nozzle 12 is a generally square shaped plate having elongated coil springs extend upwardly in an axial direction. In the reactor core the springs 28 are seated against the upper core plate and function to hold down the fuel assembly while permitting axial growth of the fuel assembly with changes in temperature within the core. During operation of the reactor, a coolant is pumped upwardly from the lower support plate up through perferations in the bottom nozzle 14, over the fuel rods 16, through the top nozzle 12 and out the upper core plate not shown. The springs 28 hold down the assembly against the lower core support plate under the influence of these hydraulic forces.

The bottom nozzle 14 is also generally square in shape and has a plurality of openings therein to permit the circulation of the reactor coolant. The upper ends and lower ends of the tubular control rod guide thimbles 18 are rigidly connected to the top nozzle 12 and the bottom nozzle 14, respectfully. The connection to the bottom nozzle is particularly difficult due to the alignment of the control rod guide thimbles with legs 15 extending from the underside of the bottom nozzle square shaped plate 30.

As shown in FIG. 1, each one of the grid structures comprises a plurality of straps which are interleaved to provide a structural network similar to an "egg-crate", that forms a plurality of generally square opening or cells through which the fuel rods 16 and the control rod guide thimbles 18 pass. The grid straps are provided with resilient fingers which engage the fuel rod 16. The guide thimbles are rigidly connected to the grid cells through which they pass and the straps generally prevent lateral displacement of the fuel rods 16 and control rod guide thimbles 18.

As stated above, the hollow tubes 18 serve as guide thimbles for the cylindrical control elements or rods 20. In order to reduce the quantity of high neutron capture material in the fuel assembly, the control rod guide thimbles 18 are composed of a relatively low neutron capture material, such as a zirconium based alloy known as Zircaloy. The basic fuel assembly structure consist of a skeleton made up of individual Zircaloy control rod guide thimbles held by Inconel or stainless steel grids with stainless steel nozzles at the top and the bottom of the structure.

Figure 3:
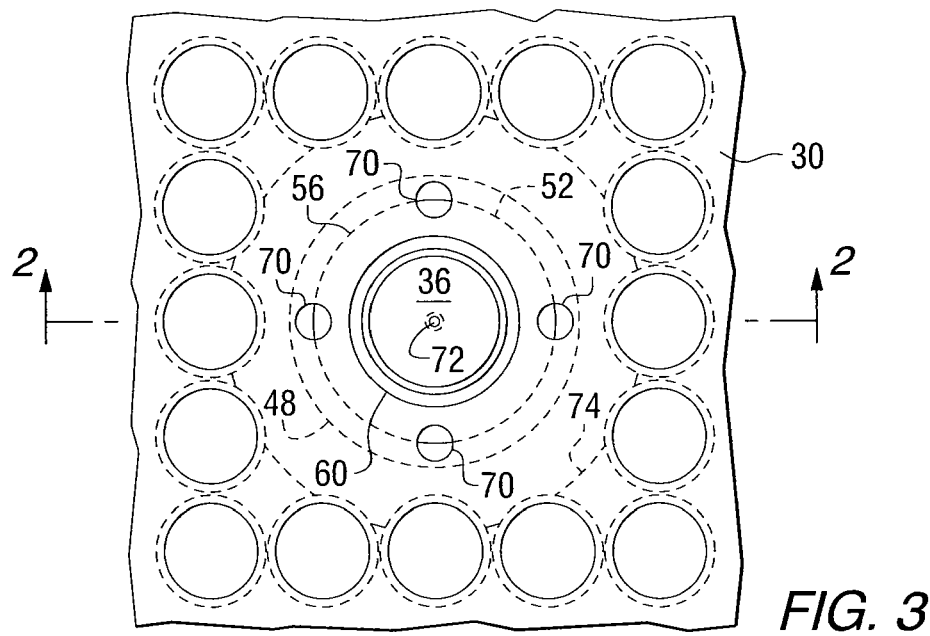
FIG. 3 is a top view of the upper plate of the bottom nozzle at a location just above a corner leg, which shows the various diameters of the counterbores through the leg.
Figure 2:
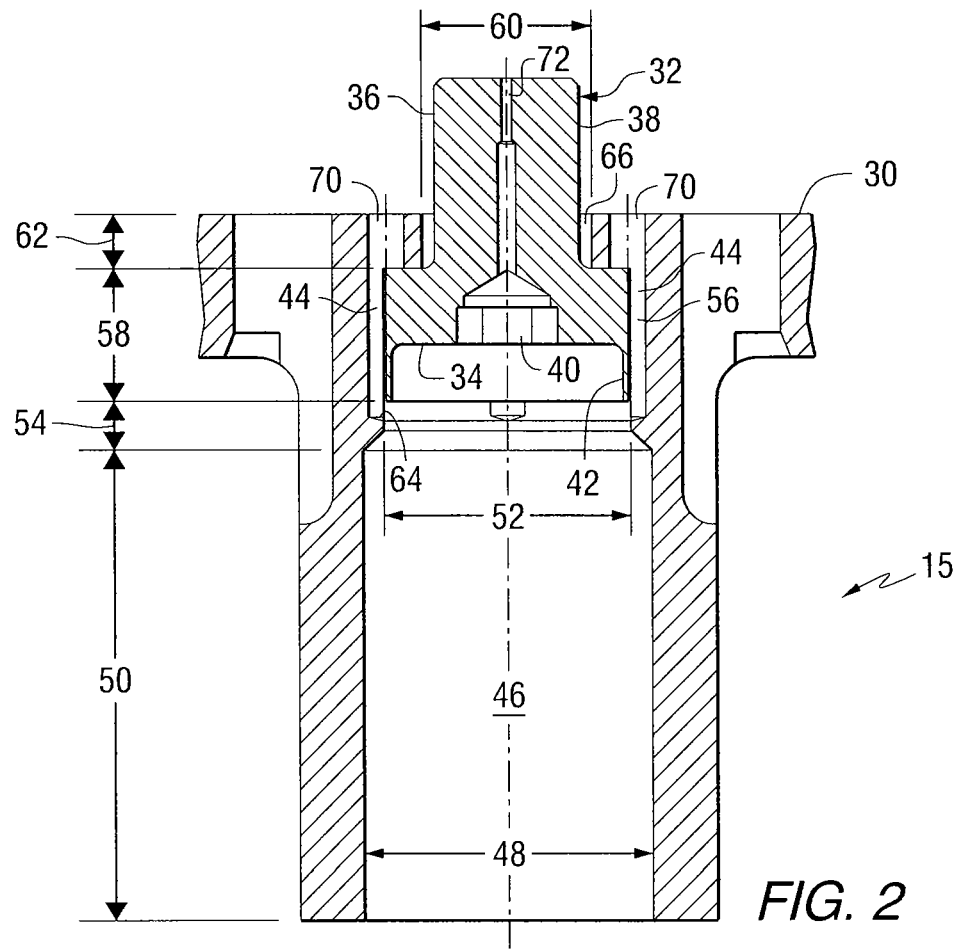
FIG. 2 is a cross sectional view of the bottom nozzle leg with the control rod guide thimble crimp screw of this invention installed.

In the past, one means of attaching the bottom nozzle 14 to the lower end of the control rod guide thimbles 18 is described in U.S. Pat. No. 3,992,259 issued Nov. 16, 1976. The current design for retaining the guide thimble screw in one type of fuel assembly design that is currently employed commercially, consists of a circular locking disc that mates with a slot in the thimble screw head and is welded to the inside of the bottom nozzle leg counterbore. The welding procedure requires the ability of a skilled operator and inspection of a finished product is very difficult because of the deep recess in the bottom nozzle leg counterbore. This weld procedure is performed after the fuel assembly is loaded with fuel rods, thus raising the level of difficulty in completing the task as well as increasing the difficulty of recovery should an improper weld be performed. The instant invention is a substantial improvement on such a current practice that requires fewer components, is much more easily inspected, does not require any complicated set-up fixturing or welding equipment or a skilled weld operator and makes rework a lot easier to accomplish with no risk to major fuel assembly components. The bottom nozzle to control rod guide thimble connection of this invention is illustrated in FIGS. 2 and 3. FIG. 2 illustrates a cross section of a bottom nozzle leg 15 showing a cross section of the elongated fastener bolt 32 of this invention that is employed to attach the bottom nozzle to the control rod guide thimble 18, The fastener bolt 32 has a head 34 and a shank 36 that extends axially in the fastener bolts elongated dimension. The shank of the fastener bolt has a profile along its circumferential surface that is designed to engage a mating female latch profile on the inside lower surface of the control rod guide thimble. In the preferred embodiment the latch profile is the thread 38 that spirals around the circumference of the shank 36. The fastener bolt head 34, on the side opposite the shank, has a torque contour 40 that can be engaged by a torque tool such as a hex driver to place the shank in engagement with the female latch profile on the interior of the control rod guide thimble. In the preferred embodiment shown in FIG. 2 the torque contour is shown as a hex although it should be appreciated that any number of other geometries can be employed for this purpose. The head 34 also has a raised, deformable rim or flange 42 that can be crimped into a notch or pocket 44 in the side wall of the counterbore 46 in the leg 15. The counterbore 46 is located centered on the axis of the control rod guide thimble 18.

The fastener bolt 32 has a head 34 and a shank 36 that extends axially in the fastener bolts elongated dimension. The shank of the fastener bolt has a profile along its circumferential surface that is designed to engage a mating female latch profile on the inside lower surface of the control rod guide thimble. In the preferred embodiment the latch profile is the thread 38 that spirals around the circumference of the shank 36. The fastener bolt head 34, on the side opposite the shank, has a torque contour that can be engaged by a torque tool such as a hex driver to place the shank in engagement with the female latch profile on the interior of the control rod guide thimble. In the preferred embodiment shown in FIG. 2 the torque contour is shown as hex although it should be appreciated that at any number of other geometries can be employed for this purpose. The head 34 also has a raised, deformable rim or flange 42 that can be crimped into a notch or pocket 44 in the side wall of the counterbore 46 in the leg 15. The counterbore 46 is located centered on the axis of the control rod guide thimble 18.

The counterbore 46 has a first counterbore that starts at the bottom of the bottom nozzle leg 15 having a diameter 48 at least as large as the diameter of the head of the fastener bolt and extends up into the bottom nozzle, parallel to the axis of the fuel assembly, a first distance 50. The counterbore then extends coaxially with the first counterbore from the first distance 50 to a second distance 54. This second counterbore has a diameter at least as large as the diameter of the fastener bolt head. The counterbore 46 then continues upward through a third counterbore that extends coaxially with the second counterbore from the second distance 54 to a third distance 58. The third counterbore has a nominal diameter 56 at least as large as the diameter of the fastener bolt head 34, with portions of the circumference of the third counterbore having a larger diameter than the second counterbore so that the intersection of the portions of the second counterbore and the portions of the third counterbore having the diameter larger than the diameter of the second counterbore forms a ledge 64. Collectively the first distance, second distance and third distance are less than the height of the lower nozzle, by the thickness of the horizontal top plate 30. A fourth bore 66 extends coaxially with the third counterbore a distance 62 from the third distance 58 through the upper surface of the top plate 30 of the bottom nozzle, in line with the control rod guide thimble 18 fastened to the upper surface of the plate 30. The diameter of the fourth bore 66 is smaller than the diameter of the head 34 of the fastener bolt 32 and extends into the third counterbore. Small holes 70 are drilled through the top surface of the top plate 30 of the bottom nozzle approximately on the center line of the circumferential wall of the third bore through a distance equal to the third and fourth distances 62 and 58 to form pockets, recesses or notches 44 in the side wall of the third counterbore. When the fastener bolt 32 is secured inside the control rod guide thimble 18 to fasten the control rod guide thimble to the bottom nozzle 14, the bolt head rim 42 is crimped outward in four places to secure the rim 42 into the recesses 44 in the side wall of the third counterbore. This action prevents the fastener bolt 32 from loosening during reactor operation or becoming loose should the bolt fail in shear, in as much as the bolt head 34, once crimped, is captured between the ledge 64 and the underside of the top plate 30. A drain hole 72 is advantageously formed along the center line of the fastener bolt 32 in the preferred embodiment.

FIG. 3 is a top view of the upper plate 30 of the bottom nozzle 14. The dashed eccentric circles represent the counterbores having a first diameter 48, and second diameter 52 and a third diameter 56. The hole 60 through the top plate 30 of the bottom nozzle 14 is shown as a solid circle with the through fastener bolt shank 36 shown protruding through the hole. In addition, small holes are drilled through the top plate 30 around the periphery of the top hole 60 with the center of the hole 70 proximate the outer circumference of the bore having the third diameter 56 to form the recesses, notches or crimp pockets into which the bolted rim 42 may be crimped. Though four such recesses 70, spaced at ninety degree angles, are shown in FIG. 3 it should be appreciated that the invention will satisfy its intended purpose with only two such diametrically opposed crimp pockets 44.

In the embodiment illustrated in FIGS. 2 and 3 the counterbore having the second diameter 52 and the counterbore having the third diameter 56 may have the same size diameter. The bottom nozzle leg 15 may be formed by first drilling from the underside of the leg a bore having the diameter 52 up through the leg a distance of 50 plus 54 plus 58. Then the fourth bore 66 may be drilled from the top having a fourth diameter 60 and extending down a distance 62. The blind holes 70 may then be drilled from the top around the periphery of the fourth bore 66 extending down a distance of 62 plus 58. Optionally, an enlarged bore may be drilled from the bottom of the leg 15 a distance of 50 to form the clean ledge 64.

Figure 4:
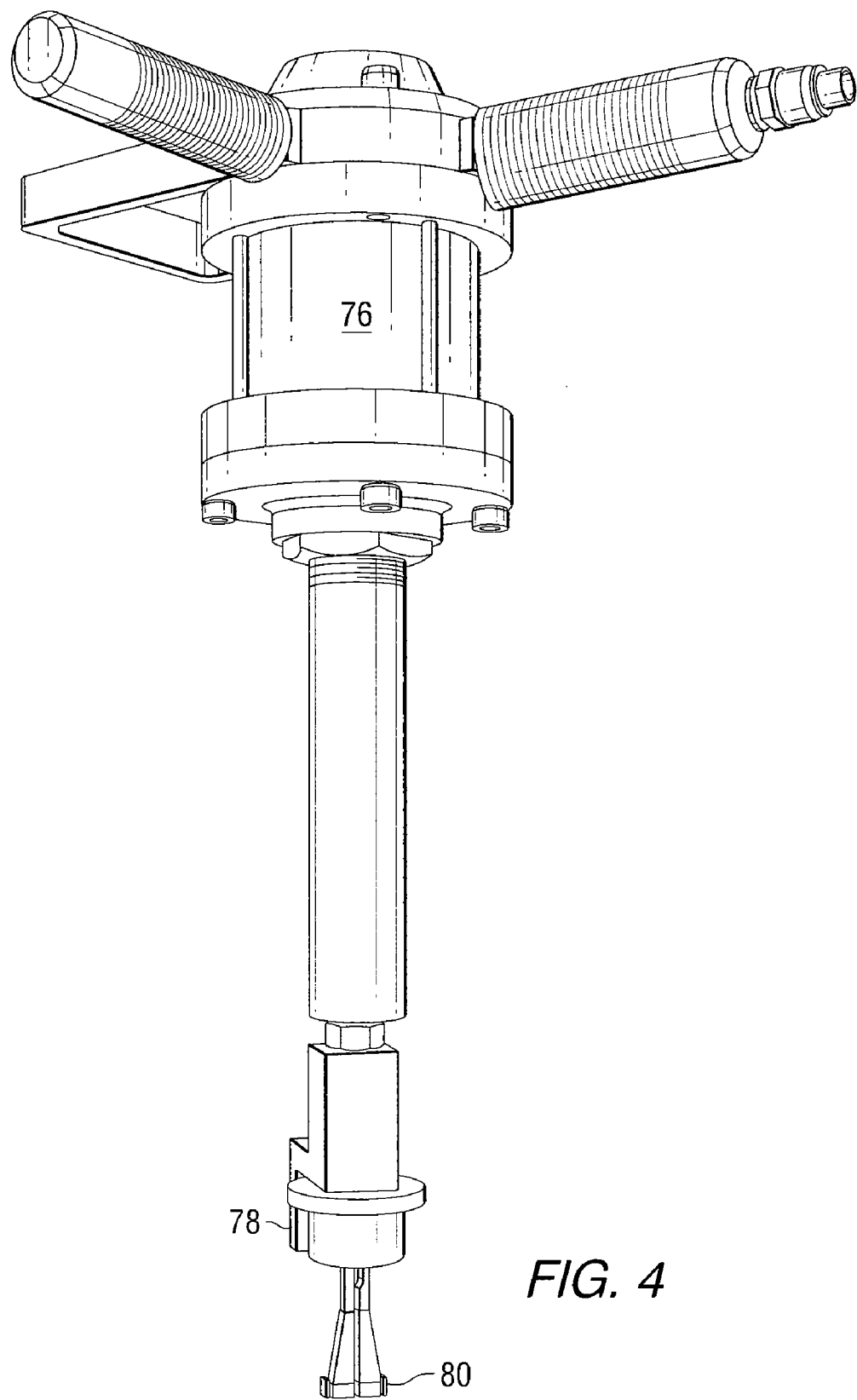
FIG. 4 is a perspective view of the crimping tool employed to crimp the bolt head rim of this invention.

FIG. 4 shows a tool that can be employed to crimp the bolt head rim 42 into the notches or recesses 44 in the circumference of the counterbore having the third diameter 56. The tool 76 has a forming surface 80 at its tip that spreads under pneumatic pressure to spread the rim 42 on the bolt head 34. The fork 78 is used to align the tool on a bottom nozzle feature.

The function of the thimble screw fastener bolt 32 is to secure the guide tubes 18 within a PWR fuel assembly to the bottom nozzle 14, thus maintaining the structural integrity of the fuel assembly 10. Given that the guide thimbles 18 serve as the structural backbone of the fuel assembly and house in-core instrumentation and control element assemblies, it is important that the thimble screw fastener bolt 32 is captured and secured, after torquing, by a secondary, positive means. The new crimped thimble screw fastener bolt design features a raised flanged 42 that is crimped into two or four blind pockets 70 which are machined into the bottom nozzle legs 15 by drilling holes through the top surface of the bottom nozzle. After the thimble screw fastener bolt 32 is crimped by the pneumatic tool 76, the screw is positively captured and restrained from rotational movement and from falling out if the screw breaks. Should the fuel assembly, with loaded fuel rods, require re-work, the thimble crimp screw fastener bolt 32 can be easily removed and replaced during the course of rework activities.

While specific embodiments of the invention have been described in detailed, it would be appreciated by those skilled in the art that various modifications and alternatives to those details could be developed in light of the overall teachings of the disclosure. Accordingly, the particular embodiments disclosed are meant to be illustrative only and not limiting as to the scope of the invention, which is to be given the full breath of the claims and any and all equivalence thereof.

What is claimed is:

1. An elongated fuel assembly for a nuclear reactor having a longitudinal axis along its elongated dimension, the fuel assembly comprising:
   (a) a top nozzle;
   (b) a bottom nozzle axially spaced from the top nozzle;
   (c) a plurality of spacer grids stacked in tandem in a spaced array between the top nozzle and the bottom nozzle, each of said spacer grids being formed from an orthogonal arrangement of straps formed in a generally egg-crate shaped pattern to define a plurality of grid cells;
   (d) a plurality of elongated control rod guide thimbles disposed through specified locations of the grid cells and extending between and fixedly attached to the top nozzle and the bottom nozzle at a top end and a bottom end of the control rod guide thimble, respectively, at least one of the control rod guide thimbles having on an interior of its bottom end a female latch profile designed to receive a fastener; and
   (e) an elongated fastener bolt having a head and shank, with the shank extending from the head of the fastener bolt concentric with the axis of the elongated dimension of the fastener bolt and having a profile designed to engage the female latch profile of the control rod guide thimble, the fastener bolt head on a side opposite the shank, having a torque contour that can be engaged by a torque tool to place the shank in engagement with the female latch profile on the interior of the control rod guide thimble, and a raised, deformable rim, the shank being inserted through a hole in the bottom nozzle to engage the female latch profile in the control rod guide thimble and fasten the control rod guide thimble to the bottom nozzle, at least a portion of the deformable rim on the head of the fastener bolt being crimped outward of the central axis of the fastener bolt to engage a recess in the bottom nozzle that locks the fastener bolt from disengaging from the female latch profile of the control rod guide thimble.

2. The fuel assembly of claim 1 wherein the female latch profile is a female thread on the interior of the bottom end of the control rod guide thimble that mates with a male thread on the shank of the fastener bolt.

3. The fuel assembly of claim 1 wherein the bottom nozzle has an underside wherein a portion of the underside, in line with the control rod guide thimble fastened to the bottom nozzle, has (i) a first counterbore, having a first diameter at least as large as the diameter of the head of the fastener bolt, that extends up into the bottom nozzle, parallel to the axis of the fuel assembly a first distance, (ii) a second counterbore that extends coaxially with the first counterbore from the first distance to a second distance wherein the second counterbore has a diameter at least as large as the diameter of the head of the fastener bolt, (iii) a third counterbore that extends coaxially with the second counterebore from the second distance to a third distance wherein the third counterbore has a nominal diameter at least as large as the diameter of the fastener bolt head, with portions of the circumference of the third counterbore having a larger diameter than the second counterbore wherein the intersection of the second counterbore and the portions of the third counterbore having the diameter larger than the second counterbore forms a ledge and the first distance, the second distance and the third distance are collectively less than a height of the lower nozzle, and (iv) a fourth bore that extends coaxially with the third counterbore from the third distance through an upper surface of the bottom nozzle in line with the control rod guide thimble fastened to the bottom nozzle, wherein the diameter of the of the fourth bore is smaller than the diameter of the head of the fastener bolt and the crimped portion of the deformable rim and the head of the fastener bolt are captured between said ledge and said fourth bore.

4. The fuel assembly of claim 3 wherein the first counterbore has a larger diameter than the second counterbore.

5. The fuel assembly of claim 3 wherein the portions of the circumference of the third counterbore having a diameter larger than the second counterbore are formed from holes around the outer circumference of the fourth bore that extend into a surface of a wall of the third counterbore and form the recesses in the bottom nozzle that locks the fastener bolt from disengaging from the female latch profile of the control rod guide thimble.

6. The fuel assembly of claim 5 wherein the holes comprise a pair of diametrically spaced holes position around the outer periphery of the fourth bore that extend into the surface of the wall of the third counterbore.

7. The fuel assembly of claim 6 wherein the holes comprise two pair of diametrically spaced holes that are positioned 90° apart around the periphery of the fourth bore.

8. The fuel assembly of claim 3 where in the portion of the underside of the bottom nozzle that the first counterbore is formed in is a leg of the bottom nozzle.

9. The fuel assembly of claim 1 wherein the torque contour on the head of the fastener bolt is a hex drive.

10. The fuel assembly of claim 1 including a drain hole extending through the head and shank along the axis of the fastener bolt.

* * * * *